United States Patent [19]

Hosoya

[11] 3,996,020
[45] Dec. 7, 1976

[54] HELICALLY FORMED STEEL CORD

[75] Inventor: Kiyoshi Hosoya, Yokohama, Japan

[73] Assignee: Tokyo Rope Mfg. Co., Ltd., Tokyo, Japan

[22] Filed: Dec. 30, 1974

[21] Appl. No.: 537,411

[52] U.S. Cl. .................................. 29/191.6; 29/193
[51] Int. Cl.² ........................................ B21B 15/02
[58] Field of Search ................. 29/191, 191.6, 193

[56] References Cited
UNITED STATES PATENTS

| | | | |
|---|---|---|---|
| 3,273,978 | 9/1966 | Paul | 29/193 X |
| 3,378,999 | 4/1968 | Roberts et al. | 29/193 X |
| 3,764,278 | 10/1973 | Ivanier | 29/193 |
| 3,936,278 | 2/1976 | Moens | 29/193 |

Primary Examiner—Arthur J. Steiner

[57] ABSTRACT

Where used as a reinforcing material for elastomeric body such as tire carcasses and wire belts for automobiles, or conveyer belts, a cord prepared by helically cold-forming a strand prepared by twisting together a plurality of wires so as to permit the cord outer diameter and pitch, respectively, to be 1.2 to 5.0 times and 4 to 21 times of the outer diameter of said strand type cord and/or wire rope type cord exhibits high elongation and, when incorporated in the elastomeric body, presents higher shock resistance, as compared with the conventional reinforcing cord.

2 Claims, 6 Drawing Figures

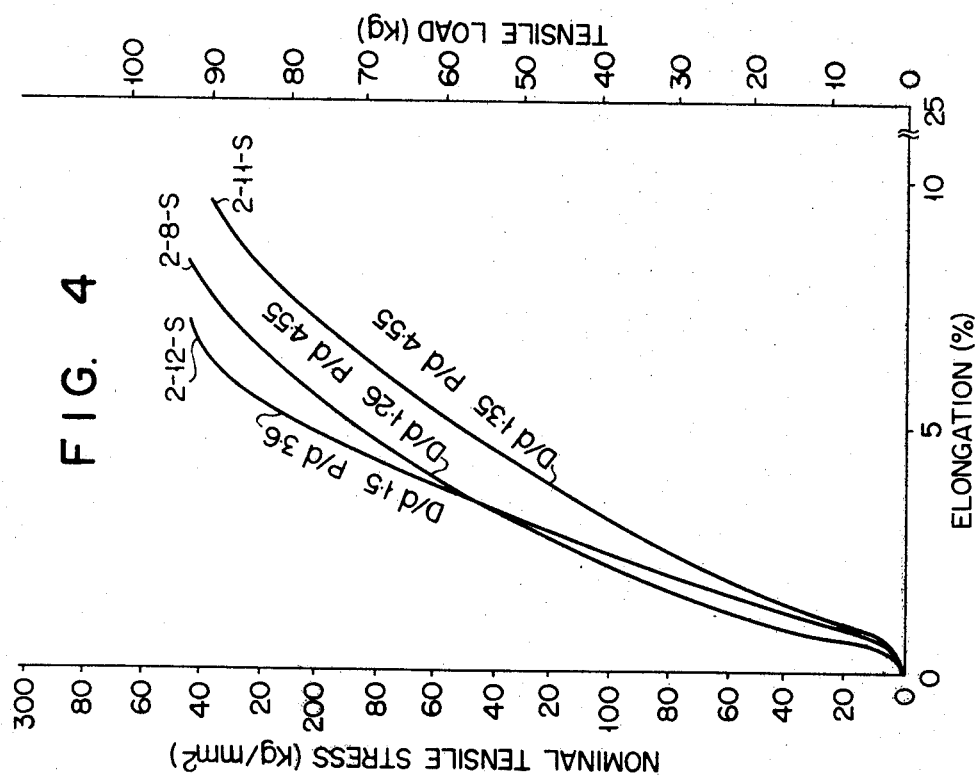
FIG. 4
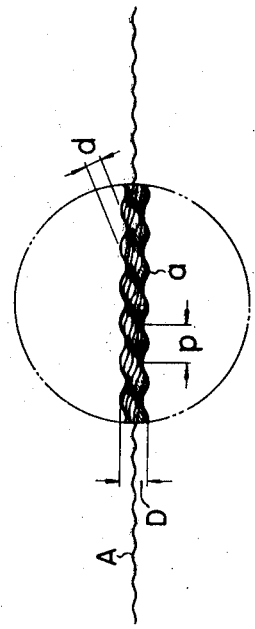
FIG. 1
FIG. 3
FIG. 2

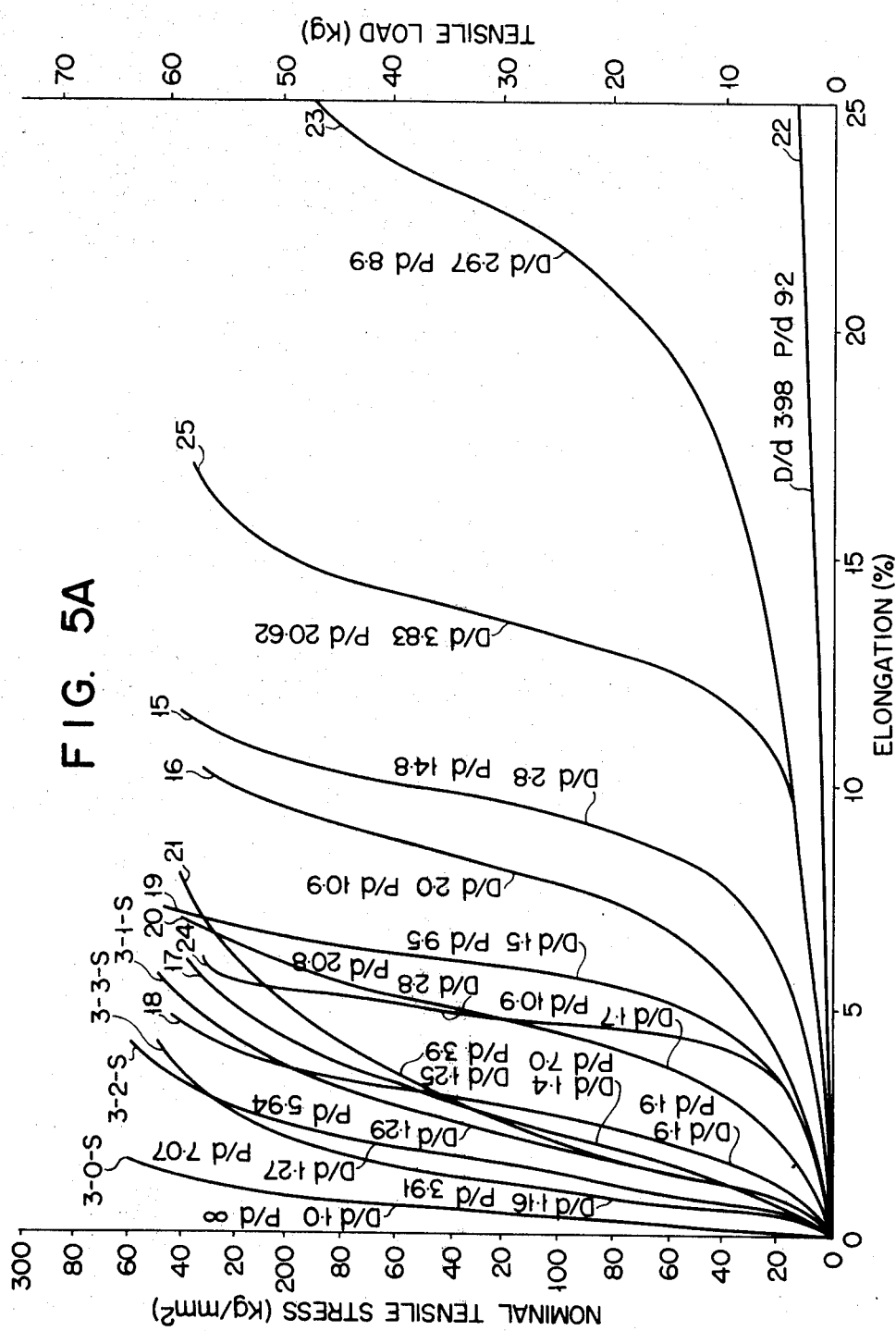

HELICALLY FORMED STEEL CORD

BACKGROUND OF THE INVENTION

This invention relates to a steel cord used as a reinforcing material for elastomeric body such as automobile tires or conveyer belts.

As the conventional reinforcing material for the above-mentioned application, there are a strand type cord (see FIG. 2) prepared by twisting together a plurality of hard steel wires and a wire rope type cord (see FIG. 3) prepared by twisting together a plurality of said strands. Particularly in the case where high elongation is demanded of the steel cord, there is in use a steel cord wherein the respective lay lengths of the strand and the wire rope composed of the strands are short and the lay of the strand in the wire rope and the lay of the wire rope are of the same direction. The steel cord short in said lay lengths indeed has higher flexibility and higher elongation than the steel cord long in said lay lengths, but is decreased in breaking load. Accordingly, where wires having the same mechanical strength are used, a steel cord composed of the wires having a shorter lay length had the drawback of being more prominently decreased in breaking strength than a steel cord composed of the wires having a longer lay length.

SUMMARY OF THE INVENTION

An object of the invention is to provide a high elongation steel cord for reinforcing elastomeric body, which is prepared by cold-working a single strand type cord or wire rope type cord in a cylindrical helical form.

Another object of the invention is to provide a reinforcing steel cord which is designed to have high shock resistance by performing the above-mentioned cold-working.

A still another object of the invention is to provide a reinforcing steel cord which is designed to have desired elongation and breaking strength by properly selecting the outer diameter and pitch of the cord helix.

A still another object of the invention is to provide a reinforcing steel cord which has more excellent performance than the conventional reinforcing material and can readily and inexpensively be produced.

Other objects and advantages of the present invention more excellent than those of the conventional technique will become apparent from the following detailed description and claims.

This invention provides a steel cord for reinforcing elastomeric body which is prepared by helically cold-forming a twisted cord consisting of a plurality of wires so as to permit the cord outer diameter and pitch, respectively, to be 1.2 to 5.0 times and 4 to 21 times the outer diameter of the cord.

BRIEF DESCRIPTION OF THE DRAWING

FIG. 1 is a front view, partly enlarged, of a steel cord for reinforcing elastomeric body according to the invention;

FIG. 2 is a cross sectional view of a five-wire strand type cord;

FIG. 3 is a cross sectional view of a wire rope type cord;

FIG. 4 is a curve diagram illustrating the relationship between the tensile load and elongation of a steel cord prepared by helically cold-working a strand obtained by twisting together five wires having a diameter of 0.31 mm in accordance with the invention, said curve diagram being calibrated in cord nominal tensile stress degrees;

FIG. 5A is a curve diagram illustrating the relationship between the tensile load and the elongation, ranging from 0 to 25%, of a steel cord prepared by helically cold-working a strand obtained by twisting together five wires having a diameter of 0.25 mm in accordance with the invention.

DETAILED DESCRIPTION OF THE PREFERRED EMBODIMENTS

Figure 5B:
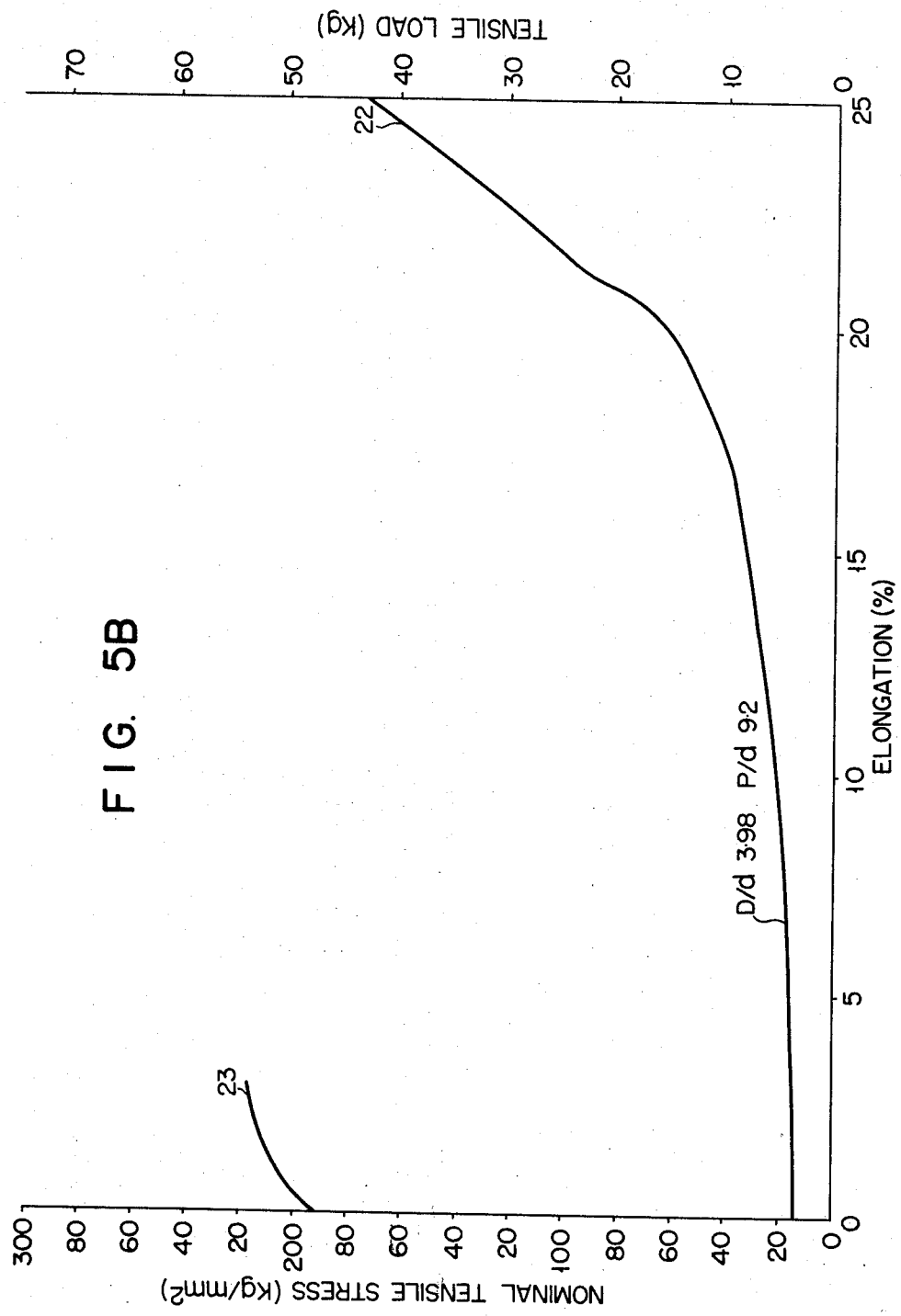
FIG. 5B is a similar curve diagram in the case where said elongation ranges from 25 to 50%, said both curve diagrams being calibrated in cord nominal tensile stress degrees.

Strands helically cold-formed in accordance with the invention were subjected to tension test, the results being presented in Table 1. The gauge lengths of respective test pieces are chosen to be all 100 mm. The alphabetic characters in Table 1 represent the respective corresponding items enumerated below.

$d$ — The outer diameter of strand as expressed in terms of millimeter.

$D$ — The outer diameter of cord helix as expressed in terms of millimeter.

$p$ — The pitch of cord helix as expressed in terms of millimeter.

$E$ — The elongation of cord helix as expressed in terms of percentage.

$BL$ — Breaking load of cord helix as expressed in terms of kilogram.

Table 1

Tension Test Results of Helically Cold-Formed Strands

| FIG. No. | Test No. | d mm | D/d | p/d | E % | BL kg | Construction |
|---|---|---|---|---|---|---|---|
| FIG. 4 | 2-8S | 0.835 | 1.26 | 4.55 | 8.08 | 92.0 | 5 × 0.31 mm |
| '' | 2-11S | '' | 1.35 | 4.55 | 9.36 | 90.0 | '' |
| '' | 2-12S | '' | 1.50 | 3.60 | 7.2 | 92.0 | '' |
| FIG. 5A | 3-0S | 0.64 | 1.0 | & ∞ | 1.87 | 64.0 | 5 × 0.25 mm |
| '' | 3-1S | '' | 1.29 | & 5.94 | 5.46 | 61.1 | '' |
| '' | 3-2S | '' | 1.27 | 7.03 | 4.08 | 63.0 | '' |
| '' | 3-3S | '' | 1.16 | 3.91 | 4.24 | 61.2 | '' |
| '' | 15 | '' | 2.8 | 14.8 | 11.76 | 58.9 | '' |
| '' | 16 | '' | 2.0 | 10.9 | 10.48 | 57.0 | '' |
| '' | 17 | '' | 1.4 | 7.0 | 6.32 | 58.8 | '' |
| '' | 18 | '' | 1.9 | 10.9 | 4.96 | 60.0 | '' |
| '' | 19 | '' | 1.5 | 9.5 | 6.88 | 60.4 | '' |
| '' | 20 | '' | 1.7 | 10.9 | 6.80 | 59.2 | '' |
| '' | 21 | '' | 1.25 | 3.9 | 7.76 | 59.5 | '' |
| FIG. 5B | 22 | '' | 3.98 | 9.2 | 49.92 | 43.2 | '' |
| '' | 23 | '' | 2.97 | 8.9 | 27.84 | 53.8 | '' |
| '' | 24 | '' | 2.8 | 20.47 | 6.08 | 58.3 | '' |

Table 1-continued

| FIG. No. | Test No. | Tension Test Results of Helically Cold-Formed Strands | | | | | |
|---|---|---|---|---|---|---|---|
| | | d mm | D/d | p/d | E % | BL kg | Construction |
| " | 25 | " | 3.83 | 20.62 | 16.96 | 58.0 | " |

FIGS. 4, 5A and 5B are stress-strain diagrams as obtained from the test results. The test number 3-OS denotes the tension test result, as a reference, of a straight 0.25 mm × 5 strand not helically formed.

To consider the curves in the stress-strain diagrams, the cords corresponding to the test numbers 3-2S, 3-3S, 17, 18 and 21 curves are not sufficiently high in elongation strength as compared with the reference cord corresponding to the test number 3-OS curve, and accordingly fails to achieve the object of the invention, so that they are excluded. But, the cords corresponding to the remaining curves are considered to attain the object of the invention. Accordingly, the scope of the claim 1 has been determined by synthesizing the foregoing results. The D/d and p/d of the cords corresponding to the remaining curves range between 1, 2 and 5 and between 4 and 21, respectively. Next, those cords corresponding to the test numbers 15, 16, 22, 23, and 25 curves whose elastic limit falls within the range having an elongation of more than 5% are claimed under the claim 2. The D/d and p/d of these cords range between 2 and 4 and between 8 and 21, respectively.

What is claimed is:
1. A reinforcement for elastomers, comprising: a cold-formed, stranded, cylindrical steel cord having a given diameter twisted into a helix, having a maximum breaking elongation of not less than 5%; the outer diameter of said helix being 1.2 to 5 times said given diameter of said cord, and the pitch of said helix being 4 to 21 times said given diameter of said cord.
2. A reinforcement according to claim 1, wherein the outer diameter of said helix is 2 to 4 times the diameter of said cord, and the pitch of said helix is 8 to 21 times the diameter of said cord.

* * * * *